United States Patent [19]

Malley

[11] Patent Number: 5,624,645
[45] Date of Patent: Apr. 29, 1997

[54] SELF-PRESSURIZING CARBONATION APPARATUS

[76] Inventor: Gregory T. Malley, 1809 E. Brookwood Ct., Phoenix, Ariz. 85048

[21] Appl. No.: 422,857

[22] Filed: Apr. 17, 1995

[51] Int. Cl.$^6$ .................................................. B01D 11/02
[52] U.S. Cl. ........................ 422/266; 99/323.1; 99/323.2; 261/DIG. 7; 426/590; 426/591
[58] Field of Search .................................... 422/261, 266, 422/274, 295, 305; 261/DIG. 7; 426/561, 551, 590, 591; 99/323.1, 323.2

[56] References Cited

U.S. PATENT DOCUMENTS

| | | | |
|---|---|---|---|
| 941,234 | 11/1909 | De Clercq | 422/275 |
| 3,186,850 | 6/1965 | Anthony | 426/86 |
| 3,476,520 | 11/1969 | Hovey | 422/310 |
| 3,480,403 | 11/1969 | Hovey | 422/238 |
| 4,186,215 | 1/1980 | Buchel | 426/86 |
| 5,021,219 | 6/1991 | Rudick | 422/112 |
| 5,106,597 | 4/1992 | Plester et al. | 422/305 |
| 5,182,084 | 1/1993 | Plester | 422/105 |

*Primary Examiner*—Robert J. Warden
*Assistant Examiner*—Krisanne M. Thornton

[57] ABSTRACT

An arrangement for carbonating a solution by pressurization of a defined spatial area in a container in which a carbonating mixture is combined with a solution. The container is typically filled with a solution to a demarcation defining a spatial area. Reactants, an acid and a base, evolve $CO_2$ when reacted in a solution. The quantity of reactants added is designated so as to generate a quantity of $CO_2$ which will increase the pressure in a defined spatial area and cause a quantity of $CO_2$ to redissolve. The result of this arrangement is a solution supersaturated with $CO_2$. The reaction chamber may also be divided into separate compartments with each compartment containing individual servings. Each compartment has an evacuation device allowing the contents of the compartment to be delivered for consumption without effecting the level of carbonation of the solution remaining in the other compartments of the container. The separate compartments of the container also allow the solution of each compartment to be individually flavored, if desired.

10 Claims, 3 Drawing Sheets

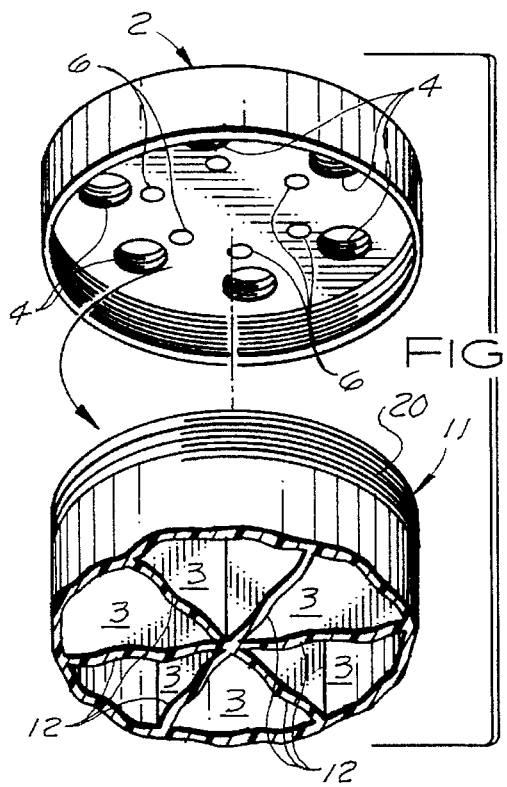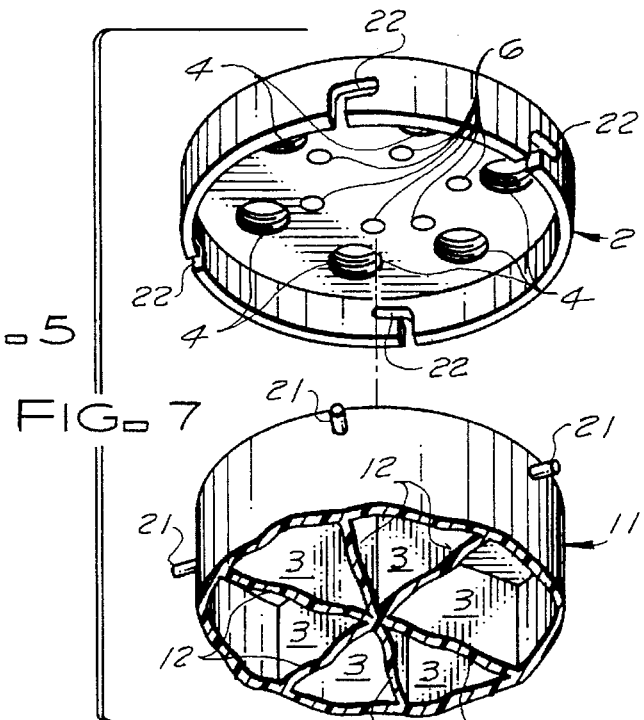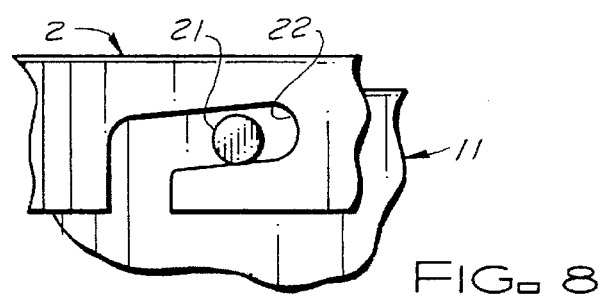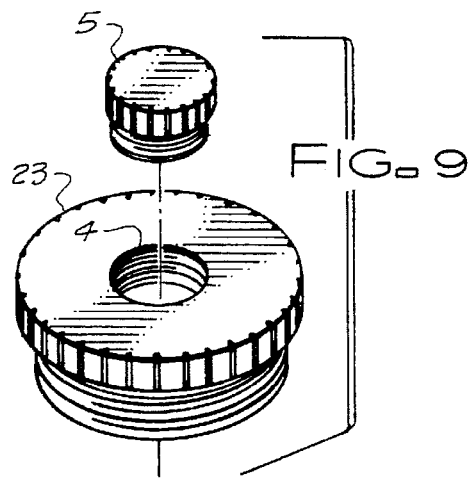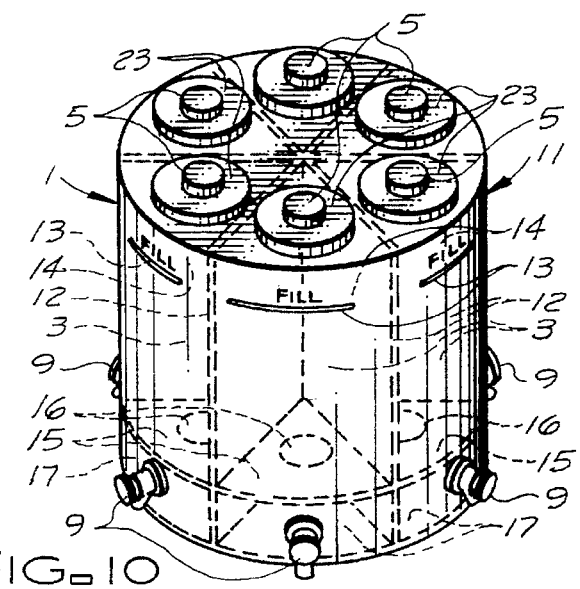

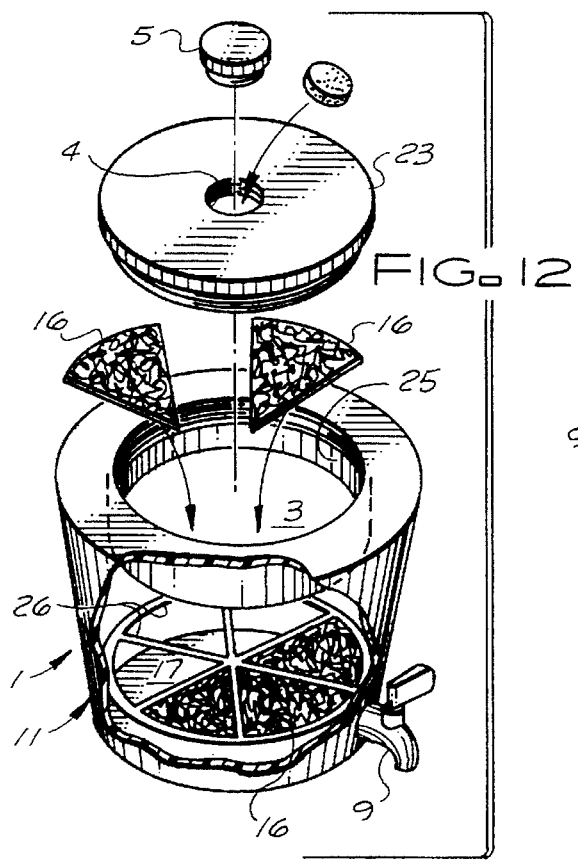
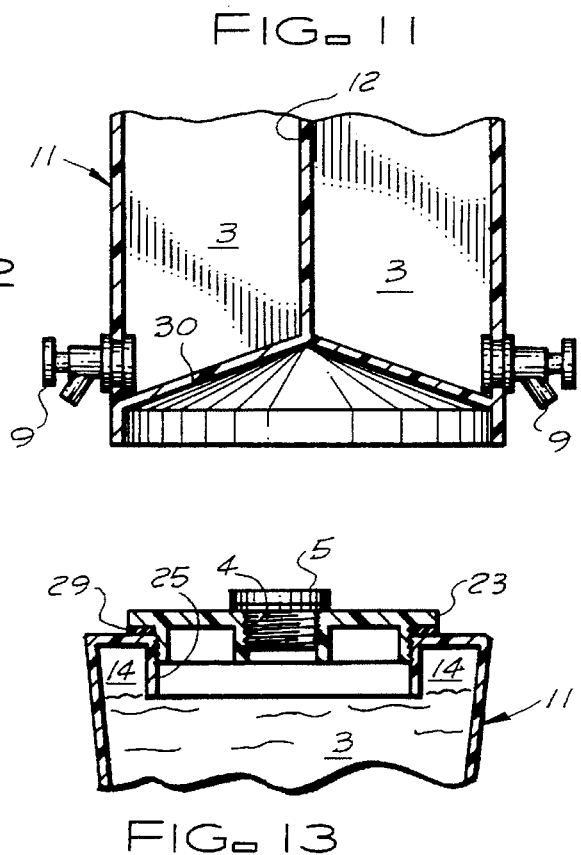
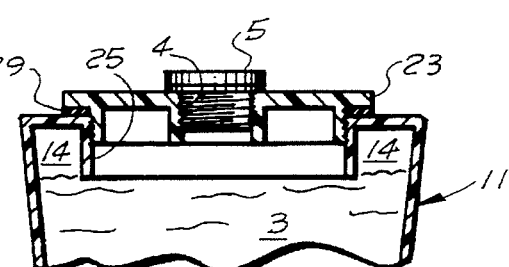
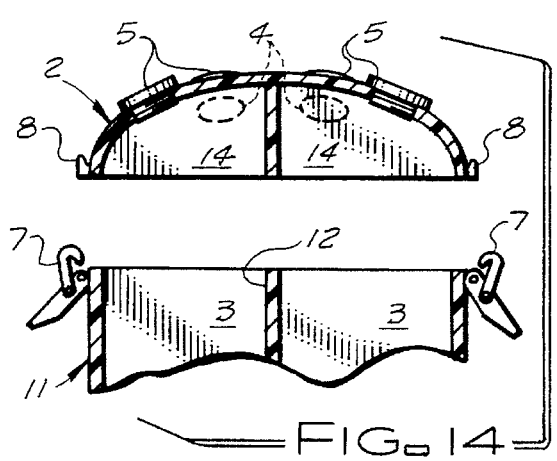
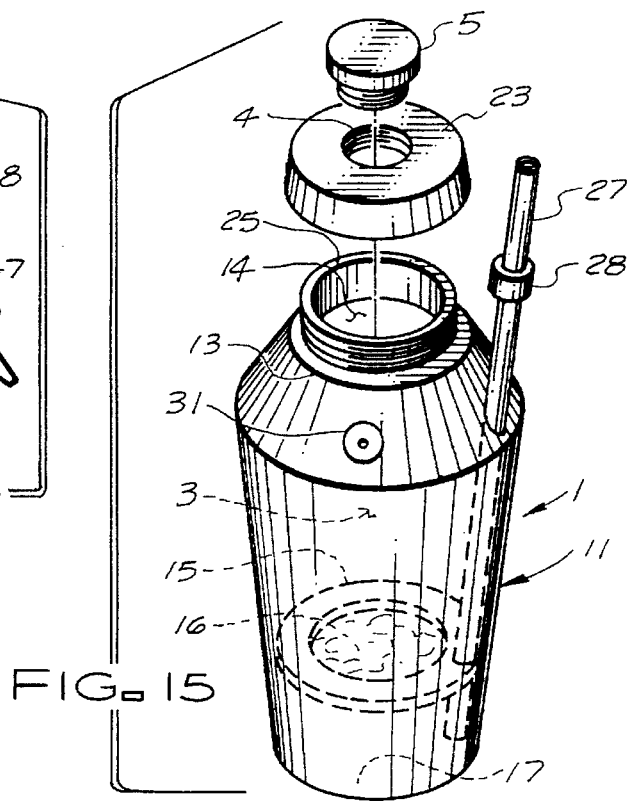

SELF-PRESSURIZING CARBONATION APPARATUS

BACKGROUND OF THE INVENTION

1. Field of the Invention

This invention relates in general to an apparatus for carbonating a solution and in particular to an arrangement and process for supersaturating a solution with $CO_2$ by pressurizing the reaction chamber through the generation of $CO_2$.

2. Discussion of the Prior Art

Carbonated beverages are bottled under pressure so that when consumed they possess a significant level of carbonation. It is desirable to have the facility for carbonating a beverage in the home due to the expense and inconvenience of procuring bottled or canned carbonated beverages. It would be burdensome to obtain $CO_2$ cannisters which have special control devices for operation, are heavy and must be returned to be refilled. Simply mixing chemical reagents which generate $CO_2$ in an open vessel results in rapid evolution of $CO_2$, leaving the solution flat to the taste.

Prior art for a home beverage carbonation system suggests a complicated system to carbonate a beverage. Rudick U.S. Pat. No. 5,021,219 for Gas Generator for a Carbonated Drink Dispenser, 1982 May 3, discloses an arrangement in which $CO_2$ is generated in a reaction chamber requiring a pressurized container or pump to cause mixing of the reactants to occur.

Another approach releases $CO_2$ over time by creating an equilibrium between $CO_2$ leaving the reaction chamber and solution which enters the reaction chamber and reacts with a carbonation mixture to produce additional $CO_2$. The reaction takes place in the vessel from which the beverage is consumed (Buchel U.S. Pat No. 4,186,215 Beverage Carbonation Arrangement, 1980 Jan. 29). In this arrangement the solution is not carbonated under pressure. One disadvantage of this arrangement is that the reaction chamber can be used only once and so entails the expense of a non-reusable reaction chamber. An additional disadvantage of another embodiment of this arrangement is that the reaction chamber may flop around in the vessel or slide out toward the opening of the vessel when it is partially inverted so that the contents may be consumed. The prospect of drinking from a glass containing a reaction chamber producing $CO_2$ may also be less than appetizing. Hovey U.S. Pat. 3,476,520 for Chemical Addition of Gas to Liquid Solvent Apparatus, 1969 Nov. 4, discloses using a predetermined amount of water with a predetermined amount of chemicals. This arrangement does not use pressure to carbonate the solution. The predetermination of the amount of solution by a fill mark relates to the quantity of solution relative to the quantity of reactants, not to a predetermined spatial area. A disadvantage of this arrangement is that it requires that the reaction be timed. If not properly timed the container may rupture. The requirement that the reaction be timed is certainly inconvenient.

This implies the need for a system for carbonating a beverage in the home that is inexpensive, convenient and simply designed.

SUMMARY OF THE INVENTION

Accordingly it is an object of the present invention to provide an improvement in the process for carbonating a beverage.

It is another object of the invention to provide a container which serves as a reaction chamber for conveniently and safely carbonating a beverage.

It is another object of the invention to provide individual servings from a container while maintaining the level of carbonation of subsequent servings.

It is another object of the invention to provide a simple system of delivery for multiple servings of a carbonated beverage with each having a different flavor, if so desired.

It is another object of the invention to significantly preclude salts from consumption while facilitating full reaction of the reagents.

Briefly, the foregoing and other objects are realized by adding a quantity of reagents to a reaction chamber filled with a solution such that there is a space of a defined area within the reaction chamber when the lid is affixed. The $CO_2$ produced when the reactants are added to the solution in the reaction chamber, which is then directly sealed, evolves into a defined spatial area. The evolution of gaseous $CO_2$ increases the pressure in a defined spatial area causing a quantity of $CO_2$ to redissolve, supersaturating the solution with $CO_2$. The spatial area is defined such that the solution will have a desired level of carbonation when consumed.

In accordance with one embodiment of the invention the reaction chamber is divided into multiple compartments, each providing one serving. The evacuation of the contents of one compartment does not result in an enlarged air space allowing the evolution of $CO_2$ from the solution remaining in the other compartments of the reaction chamber. This arrangement also allows for different flavors of beverage to be prepared at one time.

The reaction chamber walls are comprised of material capable of withstanding the anticipated pressure generated from producing the desired amount of $CO_2$. Pressure release mechanisms are provided for each compartment so that the pressure within the reaction chamber compartments cannot exceed that which the reaction chamber compartments are capable of withstanding.

A spigot is placed near the bottom of each each compartment of the reaction chamber for evacuation of the solution. Passage of the liquid through the bottom of the compartment facilitates full reaction of the reactants and provides even carbonation of the beverage delivered.

In one specific embodiment of the invention a tube with a manual pressure release mechanism is used to evacuate the contents of the container.

In accordance with the preferred embodiment of the invention a filter traps undissolved salts prior to the solution being evacuated via a spigot.

Further objects and advantages of my invention will become apparant from a consideration of the drawings and ensuing description.

BRIEF DESCRIPTION OF THE DRAWINGS

The subject invention can be more clearly understood when the following detailed description of the invention is considered in conjunction with the accompanying drawings in which:

FIG. 5 is an alternate embodiment of a removable reaction chamber lid, partially in section;

FIG. 6 is a partial side view in section of the removable reaction chamber lid shown in FIG. 5;

FIG. 7 is an alternate embodiment of a removable reaction chamber lid, partially in section;

FIG. 8 is a partial side view of the fastening arrangement of the removable reaction chamber lid shown in FIG. 7;

FIG. 9 is an alternate embodiment of a removable lid for a single reaction chamber compartment;

FIG. 10 is a mechanical schematic diagram, partially in section, of an alternate embodiment with the removable reaction chamber lid shown in FIG. 9;

FIG. 11 is a view of the bottom half of an embodiment, partially in section, with a sloped reaction chamber floor;

FIG. 12 is a view of another embodiment with a single reaction chamber compartment providing more than one serving and with the removable reaction chamber lid shown in FIG. 9;

FIG. 13 is a side view in section of the removable reaction chamber lid as shown in FIG. 9;

FIG. 14 is a side view in section of another embodiment with the appropriate air space incorporated into the lid;

FIG. 15 is a view of an embodiment in which the solution is consumed directly from the reaction chamber.

DETAILED DESCRIPTION OF THE INVENTION

Figure 1:
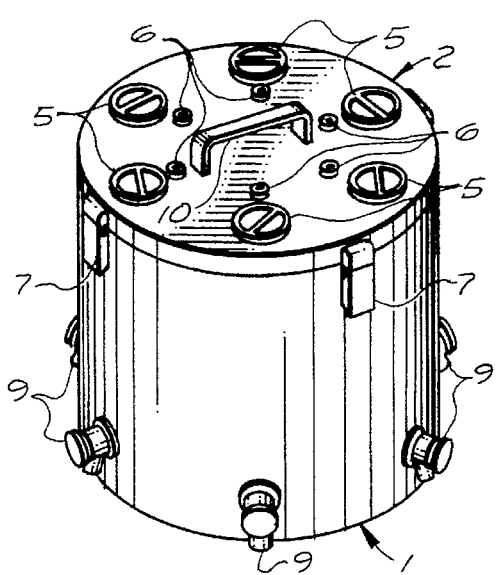
FIG. 1 is a front view of one embodiment of the invention.

Directing attention now to the drawings wherein like reference numerals refer to like parts throughout, reference is first made to FIG. 1 where there is shown a first embodiment of the invention. FIG. 1 illustrates a front view of a reaction chamber 1 with removable lid 2 which allows access to the reaction chamber compartments 3 shown in FIG. 2. A portal 4 as shown in FIG. 2 permits a solution and a carbonation mixture, which preferably includes a carbonate such as sodium bicarbonate and, or, calcium carbonate and an acid suitable for consumption, such as citric acid, to placed into the reaction chamber 1.

A pressure plug 5 allows for the reaction chamber compartments 3 to be sealed preventing $CO_2$ from escaping. A pressure release mechanism 6, if desired, allows for the release of gas, preventing pressures from exceeding that which the reaction chamber 1 can withstand. Clamps 7 secure the lid by seating into clamp seats 8 as shown in FIG. 2. A spigot 9 allows for evacuation of the solution from the reaction chamber compartment 3. A handle 10 allows for removal of the lid 2.

Figure 2:
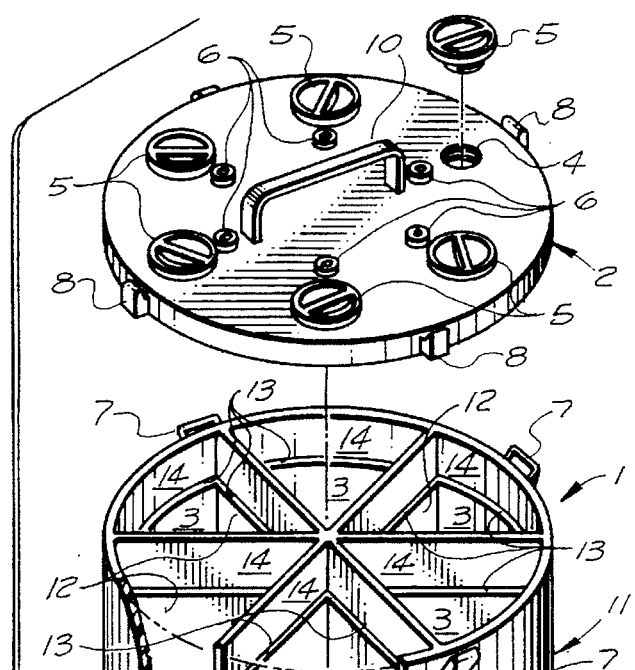
FIG. 2 is a mechanical schematic diagram partially in section of the embodiment shown in FIG. 1.

FIG. 2 illustrates a sectional view of a reaction chamber 1 which is divided into reaction chamber compartments 3 by inner chamber walls 12. The inner chamber walls 12 and the outer chamber wall 11 are constructed from any suitably rigid material capable of withstanding repeated pressurization and depressurization at the operating pressures necessary for achieving the desired order of carbonation. A demarcation 13 designates how much liquid to add to the reaction chamber compartments 3 to provide a defined spatial area 14. A defined spatial area 14 is the space remaining in the reaction chamber compartment 3 when filled with solution to a demarcation 13. In an alternate embodiment shown in FIG. 14 a defined spatial area 14 may be provided by the removable reaction chamber lid 2, thus not requiring a demarcation 13 to indicate a fill level. Filter rests 15 provide a place to seat a filter 16, if a filter is desired. The filter 16 is selected from materials which are impervious to dissolved salts, undissolved salts and other by-products of the reaction, but allows egress and ingress of gas and fluids.

Figure 4:
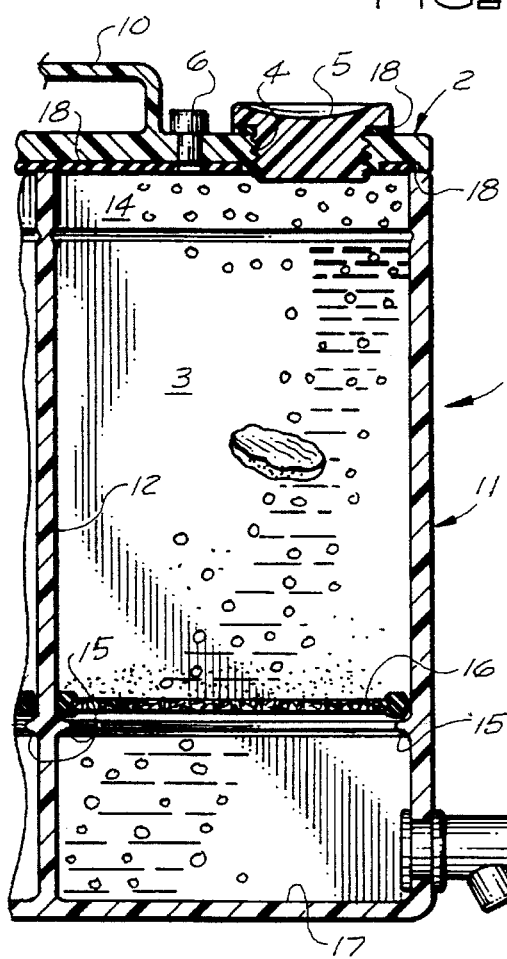
FIG. 4 is a side view in section of a single compartment of the reaction chamber shown in FIG. 2.
Figure 3:
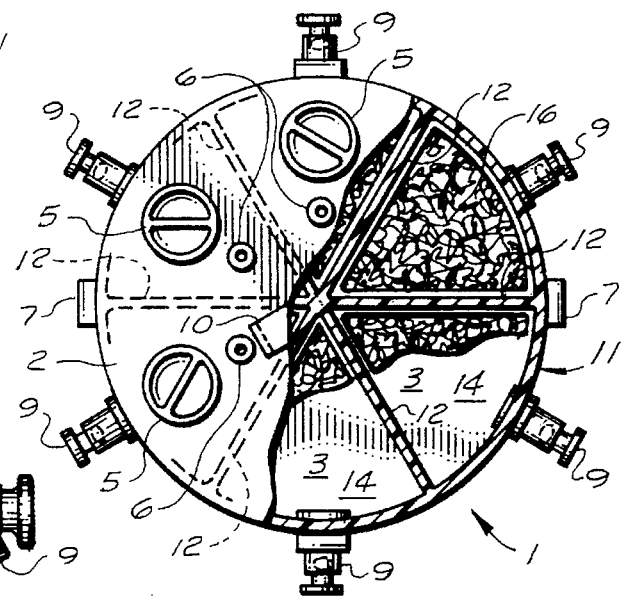
FIG. 3 is a top view partially in section of the embodiment shown in FIG. 1.

The beverage carbonation arrangement illustrated in FIGS. 1 and 2 operate as follows: Solution, and flavoring if desired, are introduced into the reaction chamber 1 by removing the lid 2 by the handle 10. Solution is added to a demarcation 13 leaving a defined spatial area 14. Clamps 7 are then used to secure the lid 2 by clamp seats 8. The interior chamber walls 12 fit into the lid underbelly 18, as shown in FIG. 4, creating a seal which remains air tight when the reaction chamber compartment 3 is pressurized. The lid underbelly 18 is made of a suitably firm but impressionable material. A designated quantity of reactants are added through the portal 4. The pressure plug 5 is inserted into the portal 4 to seal the reaction chamber compartment 3. The solution and reactants can be added in either order though it may be preferable to add the solution, and flavorings if desired, before reactants are added.

When reacted in solution the reactants produce $CO_2$. $CO_2$ evolves from the liquid into a defined spatial area 14. The evolution of $CO_2$ into a defined spatial area 14 causes an increase in the pressure in a defined spatial area 14 which will cause some of the $CO_2$ that evolved from the solution to redissolve. This produces a solution in the reaction chamber compartment 3 that is supersaturated with $CO_2$. Opening the spigot 9 allows the solution to be evacuated from the reaction chamber compartment 3. Dissolved and undissolved salts are trapped by the filter 16 situated between the spigot 9 and the added reactants. A filter 16 may be used in conjunction with reactants enclosed in a membrane material or if the reactants are enclosed in such a material a filter 16 may not be desired. If a filter 16 is not used and the reactants are not enclosed in a membrane material, undissolved salts may reside on the bottom 17 of the reaction chamber 1 below the spigot 8.

The reaction chamber compartment 3 holds what is typically a desired serving. Each reaction chamber compartment 3 may be evacuated without subjecting the carbonated solution in the rest of the reaction chamber 1 to an increase in the volume of air. The lid 2 can be removed by a handle 10 allowing for manual cleaning of the inner chamber walls 12 and removal of the filter 16 for cleaning or replacement. It may also be desirable to remove the filter 16 to add the flavoring substance and then reset the filter 16 if the flavoring molecules are of such size that they would not flow through the filter 16. FIG. 5 illustrates an alternate embodiment of the invention wherein the removable lid 2 has counterclockwise grooves 19 which screw into clockwise grooves 20 on the reaction chamber 1. FIG. 6 illustrates a side view in section of the removable reaction chamber lid 2 shown in FIG. 5 having a gasket 29 which creates a seal between the lid 2 and reaction chamber 1 which remains air tight when the reaction chamber compartment 3 is presssurized. FIG. 7 illustrates another embodiment of the invention wherein the reaction chamber 1 has a peg 21 which slides up into an angled slot 22 in the removable lid 2 thus cinching down the removable lid 2 as it is twisted onto the reaction chamber 1, creating an air tight seal.

FIG. 9 illustrates an embodiment that does not have a single removable lid 2, but large pressure plugs 23, one for each reaction chamber compartment 3. A large pressure plug 23 fits into a large portal 25 shown in FIG. 13 providing access to the reaction chamber compartment 3. The large pressure plug 23 may have a portal 4 which seats a pressure plug 5 for greater ease in sealing the reaction chamber compartment 3, if desired. FIG. 11 illustrates an embodiment with a slanted bottom 30 for more efficient evacuation of the solution. FIG. 12 illustrates an alternate embodiment having a single reaction chamber compartment 3 which can provide more than one serving. In this embodiment the filter rest cross members 26 provide a support for the filter(s) 16 which may comprise one piece or have multiple segments.

FIG. 13 is a cross sectional view of a pressure plug 5 which seats into a large pressure plug 23, fitted with a gasket 29, which seats into a large portal 25. A defined spatial area 14 is formed without a demarcation 13 for addition of the solution. When a large pressure plug 23 is used to seal a reaction chamber compartment 3 which has been filled, there is a defined spatial area 14 because solution filling the compartment does not displace the air on either side of the portal 25. FIG. 14 illustrates another embodiment wherein a defined spatial area 14 is formed without a demarcation 13. The removable reaction chamber lid 2 provides a defined spatial area 14 for the filled reaction chamber 1. FIG. 15 illustrates an embodiment wherein the reaction chamber 1 has a single reaction chamber compartment 3 from which the solution can directly be consumed. The solution is evacuated by a tube 27. A valve mechanism 31 closes, preventing the escape of air from the reaction chamber compartment 3, when pressure in the reaction chamber compartment exceeds atmospheric pressure. The valve mechanism 31 opens, allowing air to enter the reaction chamber compartment 3, when pressure in the reaction chamber compartment 3 is released. A pressure release mechanism 28 allows for pressure to be released manually. The contents will evacuate the reaction chamber 1 when the pressure release mechanism 28 is used to release the pressure inside the reaction chamber 1. The tube 27 can also be used as a straw to withdraw the contents from the reaction chamber 1. An alternate embodiment, not shown, does not use a valve mechanism 31 to introduce air into the reaction chamber compartment when evacuating the contents.

Having thus shown and described several different embodiments of the present invention, it should be noted that the same has been made by way of illustration and not limitation. The present beverage carbonation arrangement as set forth herein will suggest many alternate embodiments to those skilled in the art. For example, there are various means of securing the pressure of the chamber or of providing a pressure release mechanism, if a pressure release mechanism is desired. Accordingly, all modifications, alterations and changes coming within the spirit and scope of the invention are herein meant to be included.

I claim:

1. A method for supersaturating a solution with $CO_2$ comprising the steps of:

providing a container means wherein said container means has separate, multiple compartments having no liquid communication therebetween, and having a lid;

introducing a designated quantity of solution into each of said compartments such that a specified spatial area is defined between an upper solution surface and the lid;

introducing a designated quantity of solid chemical means into each of said compartments;

reacting said chemical means and said solution to produce $CO_2$ such that a quantity of $CO_2$ evolves into the specified spatial area and redissolves into the solution whereby the $CO_2$ in solution exceeds the solution's saturation levels, with each separate compartment maintaining the level of carbonation regardless of the evacuation of any other compartment.

2. The method as defined by claim 1 wherein said container means has a demarcation means indicating the addition of solution required to create said specified spatial area.

3. The method as defined by claim 1 wherein a dispensing valve is placed at the bottom of said container means for evacuating the solution from each compartment of said container means.

4. The method as defined by claim 1 wherein filtering means prevents the passage of any of said solid chemical means from said container means upon evacuation of the solution.

5. The method as defined by claim 1 wherein said is removable.

6. The method as defined by claim 1 wherein said container means is constructed with walls that withstand changes in pressure due to production and delivery of a carbonated solution.

7. The method as defined by claim 1 wherein a pressure release mechanism releases pressure greater than that which said container means can withstand.

8. The method as defined by claim 1 wherein a pressure plug stoppers one or all of the compartments of said container means.

9. The method as defined by claim 1 wherein the contents of said container means are evacuated through a tube having a pressure release mechanism.

10. The method as defined by claim 1 wherein said container means has a single compartment intended for a single serving.

* * * * *